ELECTRONIC CURRENT REVERSER

Filed May 31, 1963

INVENTORS
Karl Adler and Georges Ducommun
BY Imirie & Smiley
ATTORNEYS

United States Patent Office 3,344,331
Patented Sept. 26, 1967

3,344,331
ELECTRONIC CURRENT REVERSER

Karl Adler, Ruti Buren, and Georges Ducommun, Grenchen, Switzerland, assignors, by mesne assignments, to Biviator S.A., Geneva, Switzerland, a corporation of Switzerland Filed May 31, 1963, Ser. No. 284,719
Claims priority, application Switzerland, June 6, 1962, 6,838/62
12 Claims. (Cl. 318—294)

Figure 1:
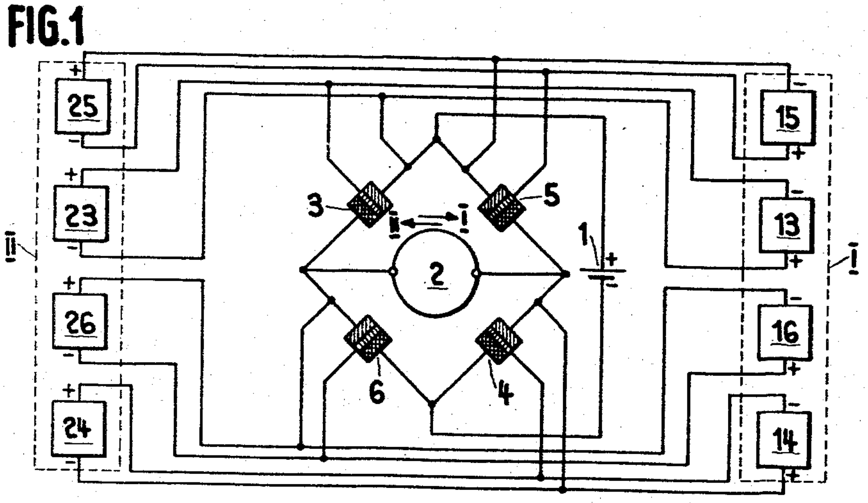

This invention relates to an electronic current reverser comprising a direct current source and a consumer, a bridge circuit having controllable circuit elements such as transistors in its branches, said direct current source being connected to the input of said circuit and said consumer being connected to the output of said bridge circuit.

In prior current reversers of this type, common control circuits for all the controllable circuit elements are provided. With these circuits optimal control of all the transistors or other controllable elements was impossible. Consequently the current at the bridge output and through the consumer respectively used to be a relatively small differential current between the currents flowing in the bridge arms because the controllable elements could not be shut off completely. Therefore the sensitivity and efficiency of the prior circuits was relatively low. The dead point or dead angle near the bridge balance was considerable.

Since only one or two controllable elements of the bridge of the prior circuits have been adapted for control, the said differential current in the consumer was relatively low due to the lack of control of at least two circuit elements of the bridge. It would be pointless to use low ohmic circuit elements in the bridge branches where no control is possible because a short circuit would practically be the result. Besides the considerable dead angle and the low sensitivity and efficiency of the prior current reversers it was also impossible, for the reasons mentioned above, to control strong currents for driving a motor or for feeding any other powerful consumer.

This invention avoids the above disadvantages of prior electronic current reversers. The current reverser according to this invention broadly comprises control circuits associated with the controllable elements, said control circuits being so disposed that all the controllable elements are under simultaneous full control, whereby pairs of diametrically opposite controllable elements are alternatively controllable in the same manner. In such a circuit any pair of diametrically opposite controllable elements may completely be shut off so that the full current of the source is delivered to the consumer. Further, the novel circuit has a substantially higher sensitivity and efficiency and a smaller dead angle than any prior circuit without needing an electro-mechanical relay or the like. Low ohmic consumers connected to the bridge output may fully be energised at any unbalance occurring in the bridge-circuit. The controllable elements may be adapted to the voltage, current and power of the consumer whereby electronic switches adapted to control power up to 1000 w. are available. Temperature differences up to 100° C. and mechanical shocks in the order of those occurring in rockets are without effect on the current reverser.

It is a particular object of this invention to provide control circuits associated with the said controllable elements which are completely independent from the said direct current source connected to the bridge input, so that the mean potential of each control circuit may be kept at the desired value allowing complete cut-off of the associated controllable element.

It is another object of this invention to accommodate transistors in the bridge branches, the rest or residual current of these transistors at zero control voltage being in the order of the working or operating currents of the source and of the consumer respectively. Under these conditions extremely low power may be controlled at a high efficiency, and such control may be effected with very low voltages and powers due to the fact that two opposite transistors may alternatively be shut off while the rest currents in the other pair of opposite transistors corresponds to the current of the consumer.

It is another object of this invention to provide active circuit elements or electric sources for instance photo-electric elements in the said control circuits, such active elements producing the required control power independently from the source feeding the bridge-circuit.

Figures 2, 3:
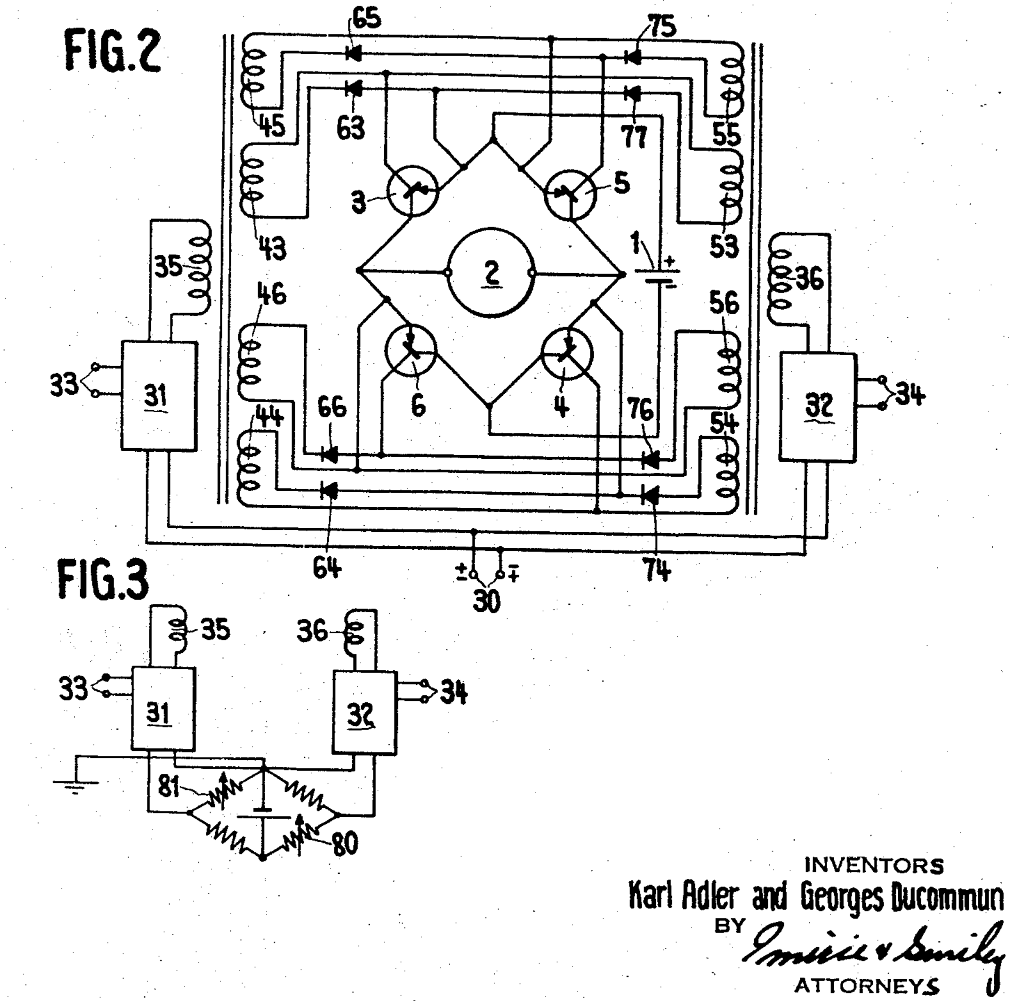

FIGURES 1 and 2 of the attached drawings are schematical illustrations of two embodiments of the invention and FIGURE 3 shows a modification.

The circuit shown in FIG. 1 has a direct current source 1 and a consumer 2, for instance a direct current motor, the problem being to connect the source to the consumer with alternatively opposite polarity. This is accomplished by means of four controllable elements 3 to 6, which may be transistors, controllable diodes, electronic tubes or the like. The electrodes of elements 3 to 6 will be designated similarly to the electrodes of transistors. The positive terminal of the current source 1 is connected to the emitters of elements 3 and 5 and the negative terminal of source 1 is connected to the collectors of elements 4 and 6. The collectors of elements 3 and 5 are connected to the emitters of elements 6 and 4 respectively. Therefore, pairs of controllable elements 3 and 6, 5 and 4 are series-connected to the voltage source 1 and the connections between each pair of controllable elements are connected to the terminals of the consumer 2. This circuit may be considered as a bridge circuit of which the input is connected to the voltage source 1 whereas its output is connected to the consumer 2.

A pair of circuit elements is associated with each of the controllable elements 3 to 6, such circuit elements being accommodated in different places I and II respectively. In accordance with their interconnection with elements 3 to 6 these circuit elements are designated 13 to 16 and 23 to 26 respectively. From the polarity of these circuits elements shown in FIG. 1 it is seen that each pair of circuit elements is connected into a closed control circuit with equal polarity so that the circuit elements operate under short circuit condition whereby no potential difference occurs between the conductors interconnecting two circuit elements when both circuit elements have equal characteristics. The conductors interconnecting a pair of circuit elements are connected to the base and emitter respectively of the associated controllable element. From FIG. 1 it is seen that the connections to the emitter and base of series connected controllable elements in one bridge arm are reversed, and the polarity of the control circuits is equal for diametrically opposite control elements 3, 4 and 5, 6 respectively.

In operation the group of circuit elements 13 to 16 and 23 to 26 are exposed to physical or chemical conditions whereby the voltage produced by these elements depends from the said physical or chemical conditions. As an example photo-electric circuit elements may be used accommodated on two different surfaces I and II respectively of an apparatus, these elements producing a voltage depending on the illumination to which they are exposed. Assuming that the voltage produced in elements 13 to 16 exceeds the voltage produced in elements 23 to 26 a potential difference will occur in each of the control circuits corresponding to the polarity indicated for elements 13 to 16. Consequently the base of control elements 3 and 4 becomes more negative while the base of control elements 5 and 6 becomes more positive, the latter elements being shut off. The current will flow from the positive terminal of the source 1 through the conducting elements 3 through the consumer in the direction of arrow I and through conducting element 4 back to the negative terminal of source 1. When the voltages of elements 23 to 26 exceed the voltage produced in elements 13 to 16, the potentials at the control electrodes of the controllable elements are reversed, so that elements 5 and 6 turn conducting while elements 3 and 4 are shut off. The current will now flow from the source 1 through element 5, through the consumer 2 in the direction of arrow II, and through element 6 back to the source. When the consumer 2 is a direct current motor having a permanent magnetic field, this motor will be reversed into the one or other direction according to the direction of the current flow. Such a motor may be used as a servo-motor for correction of any condition subject to the result of a measurement by elements 13 to 16 and 23 to 26. When elements 13 to 16 and 23 to 26 are photo-electric elements each group of such elements may be accommodated at opposite surfaces of a support whereby the servo-control may be used to turn said support and a battery of photo-electric cells mounted thereon and forming the source 1 into the direction of incidence of the highest illumination.

Instead of active circuit elements 13 to 16 and 23 to 26 producing electrical power, passive elements for instance temperature sensitive resistors, photo-resistors or the like may be used provided that each pair of such passive circuit elements is connected into a separate measuring bridge of which the output controls one of the controllable elements 3 to 6 and of which the input is connected to a separate direct current source.

As shown in FIG. 1, the control circuits of all controllable elements 3 to 6 are separate from each other. This is of importance because each of the controllable elements will operate under substantially differing direct current potential. As an example the emitters of elements 4 and 6 will alternatively assume potentials near the positive and near the negative terminal of the source 1. In the circuit shown in FIG. 1 wherein a separate control circuit is provided for each controllable element, the consumer 2 is only energized when two diametrically opposite controllable elements are conducting. This will be so when the circuit elements associated with diametrically opposite controllable elements operate under equal conditions. It is an advantage to dispose the circuit elements exposed to the quantity to be measured in such a manner that local differences of the condition to be measured, for instance local light beams when using photo-electric elements, will only influence one of such elements. Under these conditions the circuit will only respond to differences of the condition to be measured uniformly acting on all circuit elements disposed on a surface.

The circuit shown in FIG. 1 may preferably be equipped with transistors of which the rest current at zero control voltage is in the order of the operating current of the source 1 and the consumer 2. These conditions are fulfilled when a battery of photo-electric elements is used for driving a micro-motor in which case the operating current is in the order of 100 $\mu$a. In this case extremely small control voltages, for instance the voltage differences between circuit elements 13 to 16 and 23 to 26, are sufficient for properly controlling elements 3 to 6. It is sufficient that pairs of diametrically opposite transistors are shut off by control voltages of suitable polarity, whereas the other transistors are able to deliver the operating current in the order of their rest current at very low control potentials.

The high sensitivity and small dead angle of the bridge near balance condition is obtained by the simultaneous and optimal control of all controllable elements 3 to 6. When the potentials produced by circuit elements 13 to 16 and 23 to 26 are sufficient for proper control of elements 3 to 6, it is preferable to provide a number of independent control circuits comprising each two variable circuit elements. However, when an amplification is required for full control of elements 3 to 6, a circuit corresponding to the one shown in FIG. 1 would require eight independent amplifiers. It is preferable to amplify one differential signal produced by measurement and to produce separate independent control signals for elements 3 to 6, from the so amplified differential signal.

One embodiment of such a circuit is shown in FIG. 2. This arrangement and operation of the source 1, consumer 2 and of the controllable elements formed by transistors 3 to 6 correspond to the arrangement and operation of similar elements shown in FIG. 1. A differential potential available at two terminals 30 is amplified in push-pull relation by two alternating current amplifiers 31 and 32. Each of the amplifiers 31 and 32 has a modulating stage wherein an alternating current signal applied to terminals 33 and 34 is modulated in accordance with the signal applied to the amplifier input. Any suitable alternating current amplifiers may be used for amplification of the output from the above modulating stage. Similarly, any suitable modulating stage, for instance any one of the modulation stages disclosed in Radio Engineers' Handbook by F. E. Terman, McGraw-Hill Book Company Inc., 1943, page 553, may be used. In order to obtain amplification in push-pull relation as mentioned above, the said modulating stages are connected in opposite polarity or push-pull relation to the common control signal input 30. Suitable modulating circuits are also described in our copending patent application No. 407,182. The primary windings 35 and 36 of output transformers are connected to the output of amplifiers 31 and 32 respectively. Each output transformer has four similar independent secondary windings 43 to 46 and 53 to 56 respectively. Pairs of secondary windings belonging to different output transformers are connected into a control circuit connected to one of transistors 3 to 6. Each control circuit has two diodes 63 to 66 and 73 to 76 respectively for demodulation of the alternating voltages induced in the secondary windings 43 to 46 and 53 to 56 respectively.

When a differential potential of predetermined polarity at terminals 30 appears, it is obvious that alternating current signals of different amplitude are transmitted through the modulating stages of amplifiers 31 and 32, because such modulating stages are connected to terminals 30 in push-pull relation as mentioned above. When the differential input signal is of sufficient magnitude, it may be assumed that practically no alternating current signal is transmitted through the one of the amplifiers while practically the full signal is transmitted through the other amplifier. For the further consideration it is assumed that the full alternating-current signal appears at the output of amplifier 31, whereas practically no alternating-current signal appears at the output of amplifier 32. Under these circumstances alternating voltages are induced in secondary windings 43 to 46 only, so that negative potentials will be produced in the conductors between diodes 63 to 66 and 73 to 76 relatively to the conductor directly interconnecting two secondary windings. The base of transistors 3 and 4 will consequently be positive relatively to the emitter of these transistors while the base of transistors 5 and 6 is negative relatively to the emiter of these transistors. Therefore transistors 5 and 6 are conducting and transistors 3 and 4 are shut off, so that the current flows through the consumer 2 from the right to the left. When the polarity of the differential voltage applied to terminal 30 changes, winding 35 is deenergized and winding 36 is fed with alternating current. For obvious reasons the polarity of the control voltages produced in the control circuits changes so that the direction of current flow in the consumer 2 is reversed.

As shown in FIG. 3 amplifiers 31 and 32 may be connected to the output of a measuring bridge having two variable bridge branches 80 and 81. Operation of the circuit shown in FIG. 3 substantially corresponds to the operation of the circuit shown in FIG. 2. For balance condition the same direct current control potential appears at the input of the modulating stages of both amplifiers 31 and 32. When the resistance value of resistors 81 and 80 decreases the control potential applied to the modulating stage of amplifier 31 decreases, while the control potential applied to the modulating stage of amplifier 32 increases, whereby the modulating stages of amplifiers 31 and 32 are controlled in push-pull with the result substantially as described above in connection with FIG. 2.

When using pre-amplifiers as shown in FIGS. 2 to 4, extremely small differential signals may be used for proper control of the electronic current reverser.

What we claim is:

1. A current reverser comprising a direct current source and a consumer, a bridge circuit having controllable circuit elements such as transistors in its branches, said direct current source being connected to the input of said bridge circuit and said consumer being connected to the output of said bridge circuit, a control circuit associated with each of said controllable elements, each of said control circuits being independent of any other control circuit and comprising a pair of variable direct current sources continuously interconnected in differential arrangement for control of each controllable element by the direct voltage difference of the pair of direct current sources associated with it.

2. A current reverser comprising a direct current source and a consumer, a bridge circuit having controllable circuit elements such as transistors in its branches, said direct current source being connected to the output of said bridge circuit, a control circuit associated with each of said controllable elements, each of said control ciruits being independent of any other control circuit and comprising a pair of variable direct current sources continuously interconnected in such a manner that each of said controllable circuit elements is controlled by the voltage difference of the pair of direct current sources associated with it, each control circuit including a pair of circuit members controllable by a quantity to be measured, each pair of circuit members being connected into the control circuit to develop a differential signal therebetween, each controllable element being controlled by a differential signal produced by a pair of said circuit members.

3. A current reverser according to claim 2, wherein each control circuit comprises two photoelectric elements series-connected with equal polarity and located in different places, the control electrodes of the controllable element being connected to the conductors interconnecting the photoelectric elements.

4. A current reverser according to claim 2, comprising groups of four circuit elements being located each in a different place, pairs of elements comprising one element of each group being interconnected to produce a differential signal, pairs of circuit elements associated with diametrically opposite controllable elements of the bridge circuit being connected to each other and to the associated controllable element in the same manner.

5. A current reverser according to claim 4, comprising a direct current source formed by a battery of photoelectric elements, a reversible motor connected to the bridge output, and a rotatable support for said battery of photoelectric elements and said groups of photoelectric elements rotatable by said motor.

6. A current reverser according to claim 5, the said groups of photoelectric elements connected in said control circuits being distributed on opposite surfaces of said support.

7. A current reverser comprising, in combination, a bridge circuit having a 2-terminal input for connection to a unidirectional voltage source and an output comprising a pair of load terminals, there being four branches between said input terminals and said load terminals, said bridge circuit having a controllable circuit element in each of its branches and each such circuit element having a control electrode, and a control circuit for each of said control electrodes, each control circuit comprising a pair of variable direct current sources serially connected in a closed loop, each control electrode being connected to an associated pair of variable direct current sources for control thereby according to the voltage difference therebetween.

8. A current reverser comprising, in combination, a pair of sensor means, a bridge circuit having a pair of input terminals for connection to a unidirectional voltage source and a pair of output terminals for connection to a load, there being four branches between said input and said output terminals an da controllable electronic valve in each of said branches, each valve having a control electrode, said sensor means being connected in closed loop fashion and providing a plurality of control terminals at which the voltage difference between the pair of sensor means appears, said control electrodes being connected to said control terminals to control the magnitude and direction of current flow from said input terminals to said output terminals according to the magnitude and polarity of said voltage difference.

9. A current reverser comprising, in combination, a bridge circuit having input terminals for connection to a unidirectional voltage source and an output comprising a pair of load terminals, there being four branches between said input terminals and load terminals and a controllable circuit element in each of said branches, a control circuit associated with each of said controllable circuit elements, a pair of alternating current amplifiers having each an input modulating stage and an output, the modulating stages being connected in push-pull relation to a common control signal input, four independent direct potential sources connected in opposition into the control circuit of one of said controllable elements for control thereof by the potential difference of the associated pair of direct potential sources.

10. A current reverser according to claim 9, comprising an output transformer in each amplifier, each output transformer comprising four separate secondary windings, demodulator means connected to pairs of one secondary winding of each transformer, and said demodulator means being connected into each of said control circuits.

11. A current reverser according to claim 9, comprising a measuring bridge connected to the control-signal input.

12. A current reverser comprising, in combination, a bridge circuit having input terminals for connection to a unidirectional voltage source and an output comprising a pair of load terminals, there being four branches between said input terminals and said load terminals, said bridge circuit having a controllable circuit element in each of its branches and each such circuit element having a control electrode, and a control circuit for each of said control electrodes, each control circuit including a pair of circuit members controllable by a quantity to be measured, each pair of circuit members being connected in opposition to develop a differential signal therebetween in response to the quantity to be measured, each control electrode of a controllable element being connected to an associated pair of said circuit members for control thereby according to the differential signal therebetween.

References Cited

UNITED STATES PATENTS

| | | | |
|---|---|---|---|
| 2,821,639 | 1/1958 | Bright et al. | 307—88.5 |
| 3,067,337 | 12/1962 | Bowman | 330—13 |
| 3,078,379 | 2/1963 | Plogstedt et al. | 307—88.5 |

BENJAMIN DOBECK, *Primary Examiner.*

J. HEYMAN, *Assistant Examiner.*